Patented Nov. 1, 1938

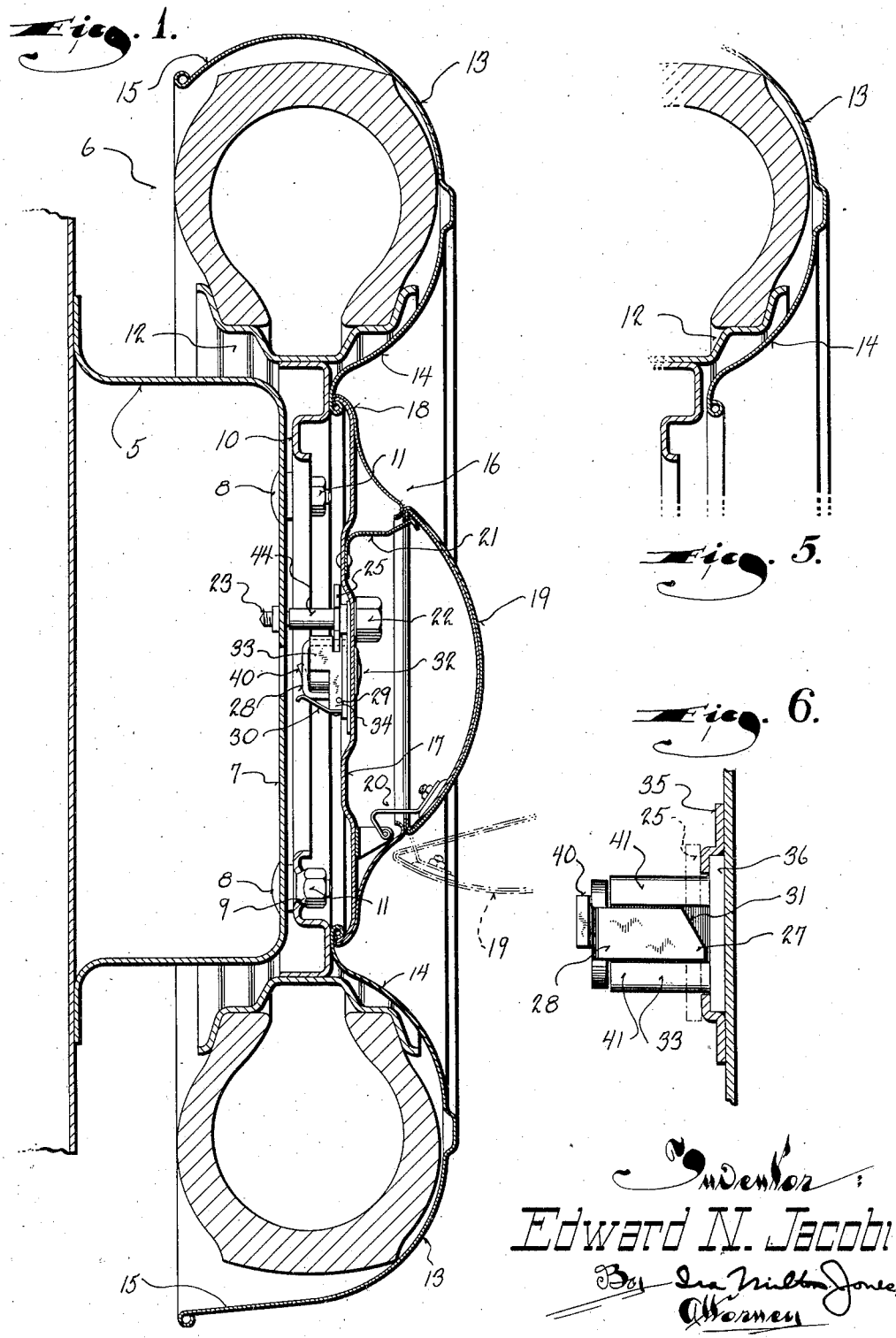

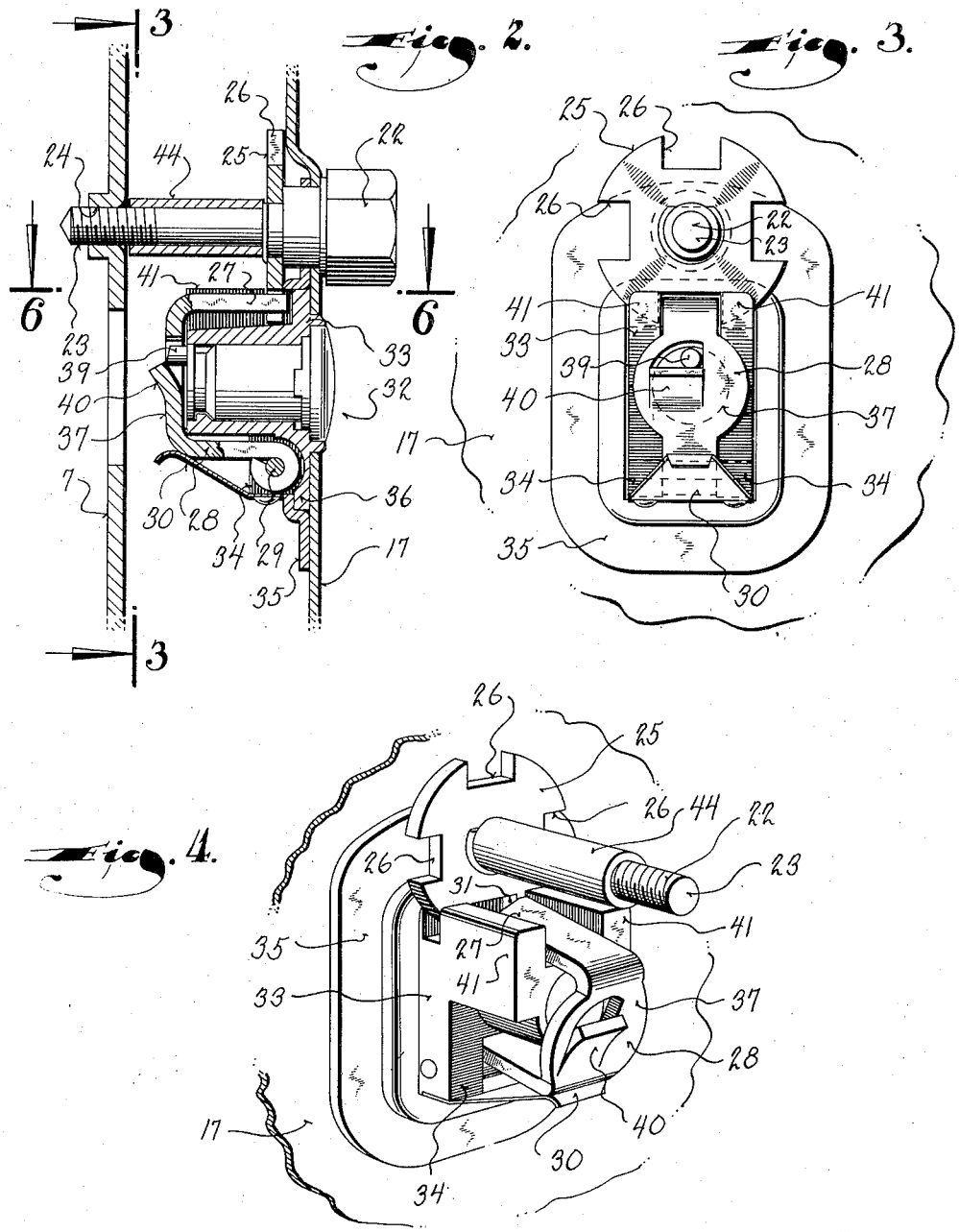

2,134,761

UNITED STATES PATENT OFFICE 2,134,761

SPARE WHEEL COVER AND LOCK

Edward N. Jacobi, Milwaukee, Wis., assignor to Briggs & Stratton Corporation, Milwaukee, Wis., a corporation of Delaware Application September 23, 1935, Serial No. 41,645

4 Claims. (Cl. 150—54)

This invention relates to automobile spare wheel covers and locks.

It is now the custom to mount the spare wheels of automobiles on fixed carrier brackets by bolts passed through the same holes in the hub portions of the wheels used to secure the wheel to the axle. To prevent theft of the spare wheel, a cover is locked over the wheel or at least over the hub portion thereof which prevents access to the nuts of the fastening bolts and thus guards against unauthorized detachment of the wheel from the carrier bracket.

Heretofore this cover was locked to the hub of the spare wheel, but in this invention as in the co-pending applications of Stephen F. Briggs, Serial No. 35,505, Patent Number 2,085,725, filed August 9th, 1935 and Harry L. Blood, Serial No. 35,504, filed August 9th, 1935, the cover is locked to the carrier bracket. This latter construction is particularly adaptable to the modern wheel construction in which the wheel is practically without a hub, as such, and comprises merely a rim on which the tire is mounted and a flange extending inwardly from the rim.

As in the aforesaid co-pending application of Harry L. Blood, the present invention contemplates a construction in which the cover is in two parts, one a sheet metal tire cover and the other a hub cap, the hub cap being locked to a carrier bracket and serving not only to prevent access to the fastening means by which the spare wheel is mounted on the carrier bracket, but also locking the tire cover against removal.

It is an object of this invention to provide means for locking the hub cap in place which is so constructed that it may be drawn tight with the required degree of tension to secure not only the hub cap but also the tire cover solidly in position and thus preclude rattling.

Another object of this invention is to provide a sheet metal tire cover of simplified and improved design to facilitate its application and removal.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate a complete example of the physical embodiment of the invention constructed according to the best mode so far devised for the practical application of the principles thereof, and in which:

Figure 1 is a cross section view through a spare wheel and the carrier bracket on which it is mounted illustrating this invention;

Figure 2 is an enlarged detail section view taken through the center of the locking mechanism;

Figure 3 is a section view through Figure 2 on the plane of the line 3—3;

Figure 4 is a perspective view of the rear of the locking mechanism showing the same in unlocked position;

Figure 5 is a fragmentary section view through the tire and cover to show how the parts are placed under spring tension; and Figure 6 is a detail section view through Figure 2 on the plane of the line 6—6.

Referring now more particularly to the accompanying drawings, in which like numerals indicate like parts throughout the several views, the numeral 5 designates a carrier bracket on which a spare wheel indicated generally by the numeral 6 is mounted. The bracket 5 may be of any suitable construction and in the present instance is illustrated as a cup-shaped stamping welded or otherwise secured to the body of an automobile with its closed bottom or end wall 7 spaced from the wall of the automobile to which the bracket is secured.

Projecting from the wall 7 are a number of studs 8 arranged in a circle and spaced so as to be received in the holes 9 with which the hub portion 10 of the spare wheel is equipped and which are used in the attachment of the wheel to the axle. Nuts 11 threaded on the studs 8 serve to clamp the hub portion 10 of the spare wheel to the mounting bracket.

The hub portion 10 of the spare wheel is in reality merely an offset flange fixed to the rim 12 of the spare wheel and extending but a short distance inwardly therefrom to define a relatively large central opening.

Disposed over the tire of the spare wheel is a sheet metal tire cover 13. This cover consists of a ring-like shell having a side covering portion 14 on one side of its median plane for disposition over the outer side wall of the spare wheel and a rim portion 15 extending from the side covering portion across to the opposite side of the median plane to terminate in an edge parallel to the median plane and defining an opening of the same diameter as the rim on the median plane. The cross sectional shape of the rim portion engageable with the top of the tire tread is convexly curved so as to hook over and slightly behind the top of the tire. From this convexly curved shape at the top of the rim the cross sectional shape of the rim progressively changes until at the bottom portion of the rim it flares outwardly. This disposes the opening defined by the edge at the rear of the rim eccentrically and downwardly to the diameter of the rim on its median plane.

With this construction the tire cover may be quickly applied or removed as it is free to swing flatwise on its hooked engagement with the top of the tire to and from its covering position.

The side covering portion 14 has a central opening preferably large enough to expose the nuts 11, and the cross sectional shape of the side covering portion is such that the peripheral edge portion circumscribing the central opening overlies and is spaced a short distance from the adjacent outer side wall of the spare wheel hub portion 10, when the cover is not being pressed in against the spare wheel. (See Figure 5.)

Closing the central opening in the tire cover and clamping the inner peripheral edge portion thereof against the adjacent hub portion 10 is a hub cap 16. The hub cap 16 comprises a stiff metal disc 17 of a diameter to extend beyond the inner peripheral edge of the tire cover and consequently completely cover the stud by which the wheel is secured to the bracket. A flange on its marginal edge and a central annular corrugation provide rigidity for the disc.

Secured over the outer face of the disc is an ornamental finishing sheath 18 which bulges outwardly from the disc and has a comparatively large central opening which is closed by a hinged door 19. The door 19 is hingedly mounted either from the ornamental finishing sheath, or, as shown, by means of a hinge structure 20 carried by the disc 17. Two or more spring fingers 21 serve to hold the door 19 closed to cooperate with the sheath 18 in providing a neat external appearance.

The hub cap is secured in position by means of a threaded stud 22 rotatably but non-longitudinally movably carried by the disc 17 with its threaded end 23 engageable in a threaded opening 24 in the wall 7 of the carrier bracket. The outer end of the stud has a hexagonal head to receive a wrench by which the stud may be turned, access being had to the head upon opening of the door 19.

As will be readily apparent, the disc 17 has a degree of resiliency so that it is possible by tightening of the stud to slightly bow the disc inwardly and thus hold not only the hub cap 16 but also the tire cover securely against the side of the spare wheel and thereby positively preclude rattling. In fact, it is possible through the stud 22 to hold the entire spare wheel firmly against the mounting bracket so that through this single means all of the associated parts are held in firm engagement and the possibility of rattling is reduced to a minimum.

Unauthorized removal of the spare wheel is precluded by locking the stud 22 against retrograde rotation. For this purpose the stud has a ratchet in the form of a washer 25 fixed thereto in position to overlie the inner face of the disc 17. The washer 25 is castellated to provide four equi-spaced rectangular recesses 26 into which a spring pressed pawl 27 engages. The pawl 27 is the outer free end portion of a U shaped bail 28 hingedly mounted as at 29 and yieldingly urged into operative position by a spring finger 30. The extreme end of the pawl is inclined as at 31 in a direction such that rotation of the stud to tighten the same is permitted while retrograde rotation is prevented.

To disengage the pawl 27 from the castellated flange or washer 25 and permit retrograde rotation of the stud, a key operable lock mechanism indicated generally by the numeral 32 is provided. This lock mechanism comprises a casing or mounting member 33 secured to the inner face of the disc 17 preferably on the axis of the wheel and in the space defined by the U shaped bail 28. In fact the hinged mounting of the bail 28 is effected by means of the lock casing or mounting member 33. For this purpose the hinged arm of the U shaped bail is received between spaced bearing lugs 34 formed as integral parts of the lock casing or mounting member. The hinge pin passes through these bearing lugs and the adjacent curled end of the bail.

It is to be noted that the spring finger 30 which serves to yieldingly hold the bail in its position at which its pawl portion 27 actively engages the castellated washer or ratchet, is riveted to the bearing blocks 34.

The actual attachment of the lock casing to the disc 17 is effected by means of a substantially rectangular plate 35 cut out to permit the projection of the lock casing therethrough and provided with an offset part at its inner periphery bordering its opening which overlies a flange 36 on the lock casing to clamp the same between it and the disc 17, the plate 35 being spot welded to the disc 17.

As best shown in Figure 2, the U shaped bail 28 embraces the lock casing in such a manner that its central wall 37 overlies the inner end of the lock casing to be accessible to the inner end of the lock cylinder. This enables the use of simple means for swinging the bail to carry its pawl portion to an unlocked position shown in Figure 4.

To so move the bail the inner end of the lock cylinder has an eccentric driving lug 39 projecting therefrom to ride under an inclined cam 40 formed as an integral part of the wall 37 of the U shaped bail. Upon rotation of the cylinder to unlocking position the eccentric lug rides under the inclined cam 40 and pushes the wall 37 rearwardly, swinging the bail against the action of its spring and disengaging its pawl portion from the castellated flange 25.

The mounting of the lock cylinder 38 in the lock casing is such that the key cannot be withdrawn from the cylinder when the cylinder is in its unlocked position of rotation. Consequently, the mechanism will not be inadvertently left in an unlocked position, for to remove the key necessitates turning the cylinder back to its locked position of rotation at which the spring pressed pawl is operative to automatically secure the stud against retrograde rotation.

Attention is directed to the fact that the free end portion of the U shaped bail which provides the pawl 27 moves between two spaced walls or abutments 41 so that the pawl is firmly held against twisting stresses as in an attempt at forced rotation of the stud 22.

While it is desirable to draw the stud 22 down tight enough to slightly bow the disc 17 and place the same in a degree of tension so that the parts will be firmly secured against rattling, excessive bowing or deflection of the disc 17 is objectionable. Hence, a spacing sleeve 44 is mounted on the stud 22. This spacing sleeve 44 is of such length that the stud may be drawn down tight enough to secure the hub cap and tire cover firmly in place, but it will not permit excessive deflection of the disc 17.

From the foregoing description taken in connection with the accompanying drawings, it will be readily apparent to those skilled in the art, that this invention provides improved and simplified means for securing a spare wheel and its tire against theft, and that through the medium of a single securing means all associated parts are firmly held against relative motion so as to reduce the possibility of rattling to a minimum.

What I claim as my invention is:

1. In combination with a mounting bracket adapted to have a spare wheel clamped thereto by fastening means engaging the hub portion of the wheel, a hub cap for disposition over the hub of the wheel and over all of the fastening means to prevent access thereto, said hub cap including a stiff metal disc and an outer ornamental sheath attached to the disc and extending outwardly therefrom to define a chamber to which access is had through a hole in the ornamental sheath, a movable door closing said hole, a threaded stud rotatably mounted on the stiff metal disc with its threaded end portion adapted for threaded engagement with the mounting bracket so that by tightening the stud the hub cap may be drawn firmly against the side of the wheel, and lock means for preventing retrograde rotation of the stud, said lock means including a lock cylinder having its keyway accessible from inside the chamber defined by the stiff metal disc and its ornamental sheath.

2. In combination with a mounting bracket adapted to have a spare wheel mounted thereon, a tire cover of form retaining sheet metal having a centrally apertured side wall to cover the outer face of the tire, a hub cap of a size to overlap the inner peripheral edge portion of the tire cover side wall, a ratchet screw clamp mounted on the undersurface of the hub cap and engageable with the mounting bracket to draw the hub cap toward the bracket and press the tire cover against the side of the tire so as to place the tire cover and hub cap in tension and thereby prevent rattling, and key controlled means for disabling the ratchet to permit unclamping of the hub cap.

3. A covering and locking structure for a spare wheel and tire mounted on a carrier by detachable fastening means comprising, a cover for the side and tread of the tire and having a central opening, a hub cap for covering the central portion of the wheel and the fastening means by which the wheel is secured to the carrier and for clamping the cover against the side of the wheel, means for securing the cap in place, ratchet means to prevent detachment of the cap, and key controlled means for disabling said ratchet means.

4. A covering and locking structure for a spare wheel and tire mounted on a carrier by detachable fastening means comprising, a cover for the side and tread of the tire and having a central opening, a hub cap for covering the central portion of the wheel and the fastening means by which it is secured to the carrier, a screw stud on the hub cap for clamping the hub cap over the opening of the cover, and key controlled ratchet means for normally preventing unclamping of said hub cap.

EDWARD N. JACOBI.